May 29, 1928.

G. H. GIBSON

APPARATUS FOR HEATING WATER

Filed June 26, 1925 2 Sheets-Sheet 1

INVENTOR
George H Gibson
BY
John E. Hubbell
ATTORNEY

May 29, 1928.
G. H. GIBSON
1,671,110
APPARATUS FOR HEATING WATER
Filed June 26, 1925    2 Sheets-Sheet 2
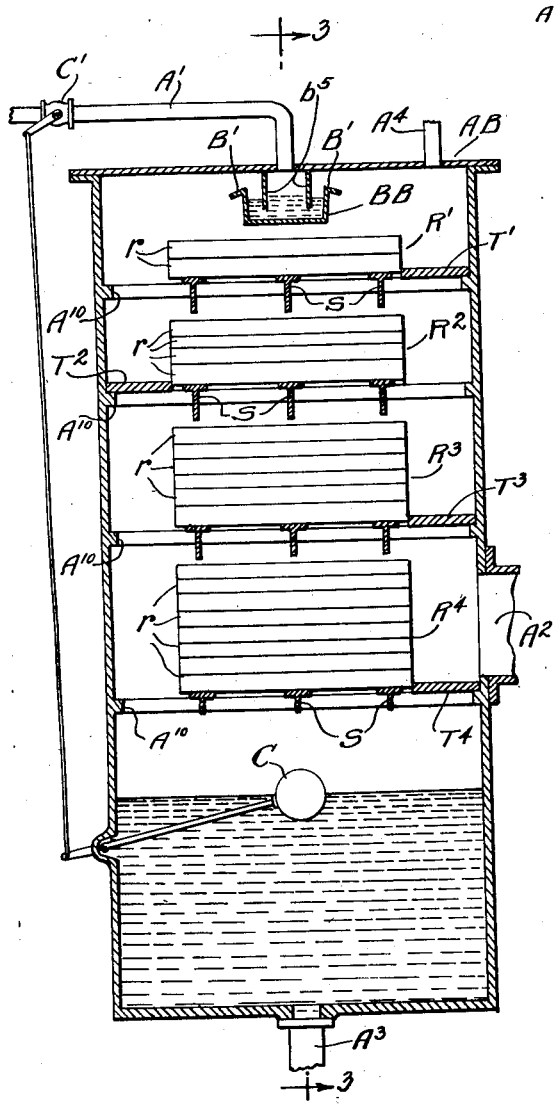
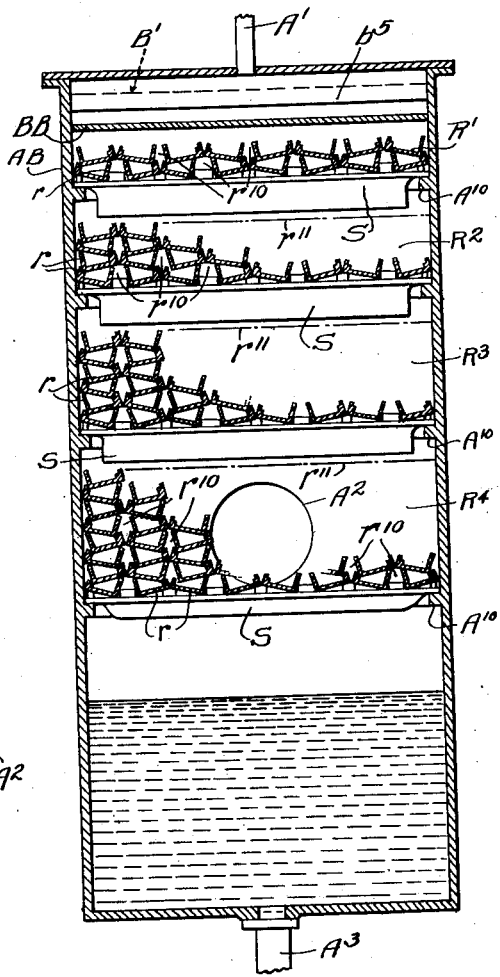
INVENTOR
George H. Gibson
BY
John E. Hubbell
ATTORNEY Patented May 29, 1928.

1,671,110

UNITED STATES PATENT OFFICE.

GEORGE H. GIBSON, OF UPPER MONTCLAIR, NEW JERSEY, ASSIGNOR TO COCHRANE CORPORATION, OF PHILADELPHIA, PENNSYLVANIA, A CORPORATION OF PENNSYLVANIA.

APPARATUS FOR HEATING WATER.

Application filed June 26, 1925. Serial No. 39,710.

My present invention consists in improved apparatus for heating water by contact with steam, and the general object of the invention is to provide practical and commercially effective apparatus in which contact between the water and the steam by which it is heated is effected in a manner which is conducive to a more rapid rate of heat transfer from the steam to the water, and hence to a greater heating capacity of apparatus of a given bulk than has heretofore been attainable. The invention is of especial utility in connection with deaerating water heaters for reasons hereinafter explained.

The invention is characterized by the provisions made for passing the water to be heated and the steam for heating it in generally opposite directions along a path of flow so proportioned as to equalize to a substantial degree, the steam velocity under full load conditions at all points along the length of the path of steam flow, with the ultimate object of obtaining or approaching the maximum practical steam velocity in all portions of the steam path, and thereby obtaining practically maximum capacity for apparatus of given bulk. In countercurrent flow contact heaters the maximum steam velocity attainable in practice, is limited by the entraining effect of the steam on the water over or through showers of which the steam passes; for if the velocity of steam at any point in the path of steam flow is high enough to entrain or sweep along appreciable quantities of water, the proper water flow and distribution of water flow is interfered with, and the efficiency and effectiveness of the apparatus are impaired.

The various features of novelty which characterize my invention are pointed out with particularity in the claims annexed to and forming a part of this specification; but for a better understanding of the invention, its advantages and specific objects attained with its use, reference should be had to the accompanying drawings and descriptive matter in which I have illustrated and described preferred embodiments of the invention.

Of the drawings:

Fig. 2 is a sectional elevation of a deaerating water heater of modified construction; and Fig. 3 is a section on the line 3—3 of Fig. 2.

Figure 1:
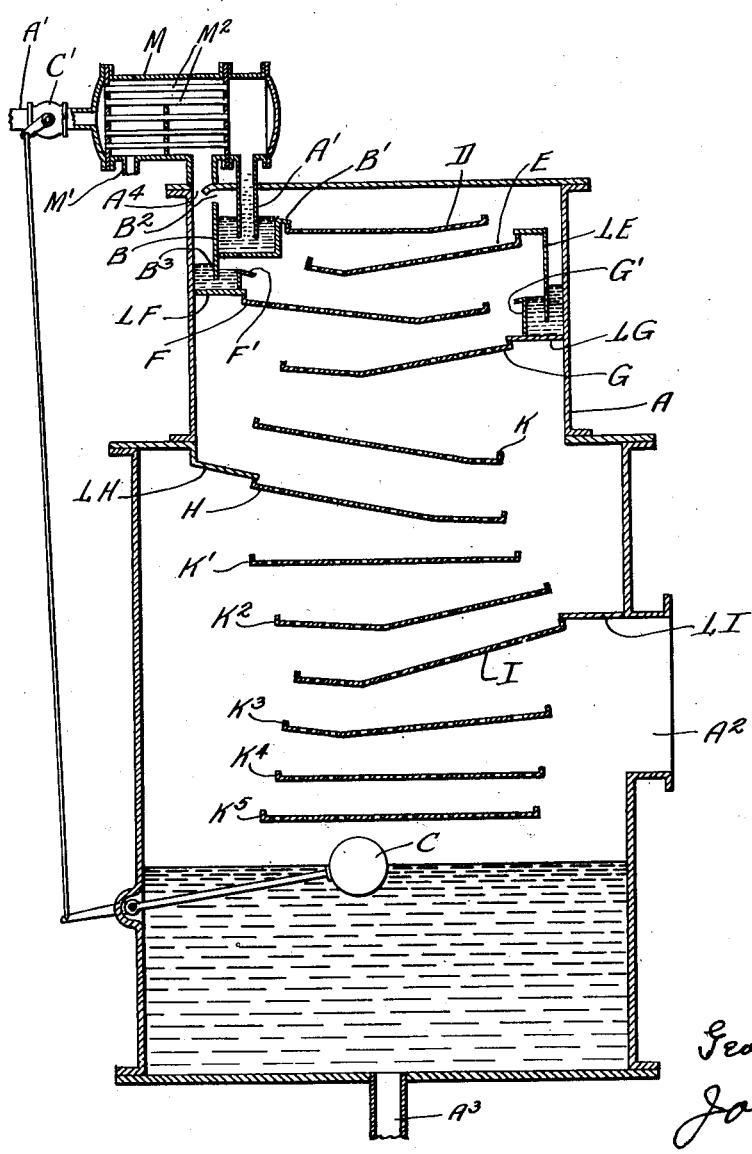
Fig. 1 is a sectional elevation of a deaerating water heater.

In the form of my invention illustrated in Fig. 1, A is the tank or shell of a water heater of simple construction, comprising a heating and deaerating chamber to the upper end of which the water to be heated and deaerated is supplied through an inlet connection A'. A² is the inlet for the heating and deaerating steam. A³ is an outlet at the bottom of the chamber for the heated water, and A⁴ is an outlet for the discharge of air at the upper end of the chamber which may open directly to the atmosphere or may be connected to a suitable vacuum creating device (not shown) according to the intended condition of operation. C represents a float connected to and operating a valve C' in the water supply connection A', to vary the supply of water in accordance with the rate at which it is withdrawn through the outlet A³ as required to maintain an approximately constant water level in the lower portion of the chamber. The water supply connection A' discharges into a distributing box or trough B located in the upper end of the chamber and provided with an overflow edge B'. Baffles or spreader trays D, E, F, G, H, and I, in conjunction with baffles LE, LF, LG, LH, and LI in the steam space of the heater divide the path of steam flow from the inlet A² to the air outlet A⁴ into seven transverse passes across the path of flow of the water. Each of these passes, moreover, is shaped to decrease in cross section in the direction of steam flow, and the decrease of cross section in each pass is progressive except in the case of the uppermost pass. The baffles D, E, F, etc., are perforated so that the water passes downward from each baffle through a multiplicity of streams corresponding to the perforations in the trays. Advantageously, though not necessarily, the lower portion of the tank A is larger in horizontal cross section than the upper portion to provide steam upflow passages at the ends of the baffles separating the different passes which are of suitably large cross section in the portions of the gas path in which the volume of uncondensed steam is relatively large. The various baffle elements LF, LG, LH, and LI form extensions, so to speak, of the corresponding pass separating perforated baffles F, G, H, and I, respectively, each preventing steam flow between the corresponding one of the last mentioned baffles and the adjacent side wall of the heater tank.

The lower passes for the steam are each divided into a plurality of separate and generally parallel portions by intermediate spreader trays or baffles. As shown, there are provided for this purpose, a single baffle K between the pass baffles G and H, two baffles K' and K² between the pass separating H and I, and three baffles K³, K⁴, and K⁵ between the lowermost pass separating baffle I and the surface of the water body in the lower portion of the heater. Advantageously, the various baffles are not arranged one directly to another, but are laterally displaced with respect to one another somewhat, to compensate for the deflecting effect of the stream of steam on the streams of water passing downward from the different baffles. With the high steam velocity employed under normal full load conditions, the streams of water falling from each perforated baffle are given appreciable horizontal velocity components by the steam stream.

The water box B is located below the top wall of the chamber and has its side wall opposite from the overflow lip B' extended upward to provide a comparatively narrow port B² through which the air and vapor escaping to the outlet A⁴ must pass, and has its lower edge B³ extended downward into a water box formed upon the baffle LF and between the adjacent side wall of the tank and a vertical part terminating in an overflow lip or edge F'. This water box receives condensation from an air cooler or auxiliary condenser M into the lower portion of the inter tube space or condensing chamber of which the air outlet A⁴ opens. The air cooler M is of the surface condenser type and comprises tubes M² traversing the condensing space and connecting sections of the water supply piping A' proper. The condensing chamber is provided with an air outlet M' which may open directly to the atmosphere or may be connected to an air pump or ejector if less than atmospheric pressure is to be maintained in the heater A. The baffle plate LE is advantageously formed with a vertical portion spaced away from the adjacent side of the heater casing to provide a channel into which water swept along the tray E and over the baffle plate LE by the steam, may fall into a water distributing box or space formed above the baffle plate LG by the uprising wall G' terminating in an upper overflow edge or lip over which water passing into the box flows down onto the pass separating baffle G.

In accordance with the present invention the passes separating trays D, E, F, G, H, and I are so disposed that the cross section of the steam path progressively diminishes from the inlet A² where the steam is introduced, to the vent A⁴ for the liberated air and uncondensed vapor, with the general object of obtaining an approximately constant lineal velocity of the steam (or steam and air mixture) at all points along the length of its path of flow. The main pass separating baffles are advantageously of such length relative to the tank shell and associated parts as to give the proper cross section to the steam path as it bends about the ends of these baffles. The velocity of the steam at any point, depends, of course, upon the volume of the steam relative to the cross section of the path of flow at that point. As the steam travels through the heater and gives up its heat to the water with which it is in contact, there is a progressive condensation, and corresponding reduction in volume, of the steam. The special proportioning and disposition of the pass separating baffles prevents the progressive decrease in steam velocity, as condensation proceeds, which would result if the steam path of flow were of constant cross section at all points along its length.

The relative rates of steam condensation at different points along the length of the path of flow depend upon a number of factors of which the most important, are the character and extent of surface of contact between the water and steam, the temperature differential between the water and the steam, and the amount of air admixed with the steam. Obviously, the rate of heat transfer between the water and the steam depends upon the manner in which the water is distributed, and the area of water surface exposed to contact with the steam. As the water moves down along its path of flow it is progressively heated up and the condensation of the steam diminishes, other things being equal, as the temperature of the water increases. Air in admixture with steam reduces the heat transfer from the steam to the water by impeding contact between the steam and water, and also because the presence of the air reduces the temperature of the air steam mixture below the temperature of steam at the pressure of the air steam mixture. The percentage of air admixed with the steam increases of course as the air vent A⁴ is approached, both because of the reduction in the amount of steam as a result of condensation, and also because of the progressive liberation of air from the water as the latter is progressively heated up and scrubbed by the air steam mixture.

In consequence of the reduction in heat transfer in the initial portion of the path of steam flow resulting from the reduced temperature difference between the steam and water in this portion of the path, and the reduction in heat transfer in the final portion of the path of steam flow due to the concentration of air in the air steam mixture, the maximum rate of water heating and of steam condensation will occur in an intermediate portion of the path of steam flow, and in apparatus of the particular form shown in Fig. 1, ordinarily will occur in some portion of the flow path between the baffles F and I. The point at which condensation of the steam will be at a maximum will vary somewhat with the load on the heater, but since the primary purpose of the invention is to increase the effective capacity of the apparatus, it is sufficient to proportion and arrange the trays to obtain the desired approximately uniform flow velocities in the different portions of the steam path when the heater load is at or about its normal maximum. If maximum efficiency is obtained at the maximum normal load, the efficiencies at other loads will be sufficient. The proper tray disposition in a heater of given design can be determined or approximated by theoretical calculation, but in practice will ordinarily be determined from experimental data.

The disposition of the trays to provide a steam path of flow which is progressively reduced in cross section in more or less exact correspondence with the volume of the steam, gives a substantial increase in capacity over that obtainable with trays disposed in the ordinary manner to provide a steam flow path in which there is no such progressive reduction in the cross section of the steam flow path. This increase in capacity attainable with the use of the invention results from the fact that with the invention the steam flow velocity can approach a practical maximum at all points along the path of steam flow, whereas with a path of steam flow of uniform cross section, the maximum practical steam velocity is attainable only at the entrance end of the steam path where the volume of the steam is at a maximum. In apparatus of this character, the maximum practical velocity of the steam is limited and determined by the fact that a greater velocity results in a water entraining and deflecting effect by the steam, which disturbs the flow, and the distribution of flow, of the water so as to thereby decrease the rate of heat transfer. The water entraining effect of excessive steam velocity is highly deleterious moreover, where deaeration of the water is important, not only because it leads to insufficient water heating, but also because it thickens the water streams and interferes with the liberation of air from the water. Excessively high steam velocity is also objectionable because of the increased moisture carried out of the heater through the air vent which is especially objectionable because of its effect on the vacuum creating means when a pressure less than that of the atmosphere is maintained in the heater.

It should be noted that while the water heating effect of the initial portion of the steam path of flow is relatively small, the high temperature of the water and the small amount of air admixed with the steam, jointly contribute to make this portion of the apparatus highly effective in eliminating the final, and most difficult to remove, portion of the air initially contained in the water supplied to the heater. The multiplicity of flow paths into which each of the lower three transverse steam passes are divided not only contributes to the increased contact area, but also desirably retards the downflow of the water and effectively contributes to the proper distribution of steam and water flow. The baffle arrangement permits of obtaining the desired effect with a comparatively small number of differently shaped baffle or tray forms.

In Figs. 2 and 3 I have illustrated another form of construction adapted for practical use possessing many of the advantages of the construction shown in Fig. 1, but somewhat simpler in construction and more compact than the latter. In the heater AB, shown in Figs. 2 and 3, the path of steam flow from the steam inlet $A^2$ to the air outlet $A^4$ is divided into four transverse passes. In each pass is located a corresponding bank $R'$, $R^2$, $R^3$, or $R^4$ or trays $r$. For convenience in Fig. 3 a portion only of the full number of trays $r$ in each of the three lower banks of such trays are shown. In the actual construction illustrated the trays $r$ in each of the three lower banks are uniformly spaced throughout the space between the opposite sides of the enclosing chamber seen in Fig. 3 and between the supports S at the bottom of the bank and the dotted line $r^{11}$ which marks the level of the top of the bank. Each tray $r$ as shown is a horizontally disposed trough. The ends of each trough shaped tray or baffle $r$ are closed and the trays are so shaped that the trays may be stacked up with the bottom of each upper tray inclined to the bottom of the tray immediately beneath it. The trays $r$ of each bank are stacked up to provide a plurality of horizontally disposed steam channels $r^{10}$ between and parallel with the length of the trays $r$. The steam channels $r^{10}$ are open at their ends and the steam flowing through the channels $r^{10}$ is in contact with the trays $r$ and with the water flowing over the side edges of the latter. The number of superimposed rows of trays $r$ in the different tray banks is varied to progressively reduce the number of channels $r^{10}$, and thereby contract the steam path in correspondence with the reduced volume of steam in the tray banks successively traversed.

Each tray stack or bank is supported, as shown, on cross beams S resting at their ends on internal ribs or brackets $A^{10}$ carried by the heater shell. Baffles $T'$, $T^2$, $T^3$, and $T^4$, one extending from one end of the bottom row of trays in the corresponding tray bank and an adjacent side wall of the heater shell, prevent the steam from passing the tray banks. The water distributing box BB, as shown, is a trough with an overflow lip or edge $B'$ at each side, and is located immediately above and extends transversely to the trays $r$ in the tray bank $R'$. $b^5$ represents depending baffles from the top wall of the heater shell which extend down into the box BB and thus provide a water seal between the interior of the heater and the cold water inlet pipe $A'$. Since all of the different trays $r$ may be castings of exactly the same shape and dimensions, the construction shown in Figs. 2 and 3 is exceedingly simple and relatively inexpensive from the manufacturing standpoint, and the area of steam and water contact surface with this form of construction is relatively large.

In each of the constructions shown, the steam flow and water flow are not directly counter to one another in the successive individual transverse passes into which the path of steam flow is divided, but in each form the apparatus as a whole operates on the counter current principle, since the water passing through the apparatus successively traverses successive portions of the path of steam flow, and the initial contact of the water with the steam is in the final portion of the steam path, and the final contact of the water with the steam is in the initial portion of the steam path. In the construction shown in Figs. 2 and 3 as in that shown in Fig. 1, the water supplied through the inlet $A'$ is initially at a temperature appreciably below the temperature of the steam supplied through the steam inlet $A^2$, but the water attains the temperature of the steam at or before the time it passes below the level of the bottom of the steam inlet. The downward velocity of the water is retarded by the trays which thus increases the time of contact as well as the surface area of contact between the water and the steam. Condensation of so much of the steam supplied occurs as is sufficient to heat the water to the temperature of the steam. As the water is progressively heated up the volume of the steam in contact therewith is diminished, but owing to the contracting form of the path of steam flow a high and substantially uniform steam velocity is maintained from one end of the path of steam flow to the other thus giving apparatus of given bulk a relatively high capacity. The fact that in each form of the invention the zig-zag steam path of flow comprises superposed horizontally disposed passes extending from one side of the chamber to the other gives a relatively very large steam and water contact area in apparatus of given bulk.

While in accordance with the provisions of the statutes I have illustrated and described the best forms of my invention now known to me, it will be apparent to those skilled in the art that changes may be made in the form of the apparatus and method of operation described and illustrated in detail herein without departing from the spirit of my invention as set forth in the appended claims, and that certain features of the invention may sometimes be used with advantage without a corresponding use of other features.

Having now described my invention, what I claim as new and desire to secure by Letters Patent, is:

1. In a water heater comprising a heating chamber providing a steam space and having a water inlet to, and an air outlet from the upper end of said space, and a steam inlet to the lower end of said space, the improvement which consists in baffles disposed in said chamber to horizontally distribute the down-flowing water and to retard its downflow velocity and arranged to divide said steam space into a zig-zag path of steam flow leading from said steam inlet to said air outlet, said path progressively contracting in cross section as it approaches said air outlet and comprising a plurality of passes extending between opposing sides of said chamber in which the steam flows horizontally across the chamber in one direction, and a plurality of passes alternating with the first mentioned passes in which the steam flows horizontally across the chamber in the opposite direction.

2. In an open water heater comprising a steam space with a water inlet to, and an air outlet from the upper end of said space and a steam inlet to the lower end of said space, the improvement which consists in a plurality of superimposed baffles for retarding the downflow velocity of the water and causing it to fall through the steam space in a multiplicity of separated streams, and means associated with certain of said baffles to provide a zig-zag path of steam flow between said steam inlet and air outlet, each of the lower passes of which path includes a plurality of said baffles greater in number than are included in the pass immediately above it.

3. In an open feed water heater comprising a heating chamber to the upper end of which the water to be heated is admitted, and superposed water spreading devices extending across the path of the descending water, and tending to deflect water alternately away from opposing sides of said chamber and provisions for passing steam for heating the water across the chamber in one direction between two of said devices and then across the chamber in the opposite direction above the upper of the said two devices, the improvement which consists in means providing a water channel at the side of said chamber toward which the steam flows, said channel being open at its upper end to receive water swept into it by said last mentioned steam flow, and open at its lower end to discharge water onto the lower of said two devices.

4. In an open water heater comprising a steam chamber with a water inlet to, and an air outlet from the upper end of the chamber and a steam inlet in the lower end of said chamber, the improvement which consists in superposed baffles extending part way across said chamber for retarding and distributing the downflowing water and arranged to form a steam path of flow between said inlet and outlet, comprising a plurality of successive transverse passes across the path of flow of the water some of which passes include a plurality of said baffles with the lower baffles of each such plurality projecting laterally beyond the baffles immediately above them at the side of the chamber toward which the steam in the corresponding pass is moving.

Signed at Philadelphia in the county of Philadelphia and State of Pennsylvania this 24th day of June, A. D. 1925.

GEORGE H. GIBSON.